(12) United States Patent
Kariyasu et al.

(10) Patent No.: US 11,059,518 B2
(45) Date of Patent: Jul. 13, 2021

(54) VEHICLE FRAME STRUCTURE

(71) Applicant: HONDA MOTOR CO., LTD., Tokyo (JP)

(72) Inventors: Takeyuki Kariyasu, Wako (JP); Takeshi Kamiyama, Wako (JP); Masayuki Hirukawa, Wako (JP); Yuji Maki, Wako (JP); Ryota Yamagishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 43 days.

(21) Appl. No.: 16/575,683

(22) Filed: Sep. 19, 2019

(65) Prior Publication Data
US 2020/0102015 A1 Apr. 2, 2020

(30) Foreign Application Priority Data
Sep. 28, 2018 (JP) .............................. JP2018-185985

(51) Int. Cl.
*B62D 21/15* (2006.01)
*B62D 21/06* (2006.01)
(Continued)

(52) U.S. Cl.
CPC ............ *B62D 21/152* (2013.01); *B60R 19/02* (2013.01); *B62D 21/05* (2013.01); *B62D 21/06* (2013.01); *B62D 21/11* (2013.01); *B62D 23/005* (2013.01)

(58) Field of Classification Search
CPC ...... B62D 21/152; B62D 21/05; B62D 21/06; B62D 21/11; B62D 23/005; B60R 19/02; B60R 19/12
See application file for complete search history.

(56) References Cited

U.S. PATENT DOCUMENTS 4,045,075 A * 8/1977 Pulver ................... B62D 21/08
 296/205
4,217,970 A * 8/1980 Chika .................. B60G 21/055
 180/298

(Continued)

FOREIGN PATENT DOCUMENTS

JP 2006-103369 4/2006
JP 2011-046242 3/2011

OTHER PUBLICATIONS

Japanese Office Action dated Jun. 2, 2020, English translation included, 9 pages.

*Primary Examiner* — Frank B Vanaman
(74) *Attorney, Agent, or Firm* — Rankin, Hill & Clark LLP

(57) ABSTRACT

In a vehicle frame structure, upper ends of a front frame and a rear frame, which connect a lower frame and an upper frame vertically, are connected to each other above the upper frame, and a front portion frame assembly is connected to a main frame assembly via the lower frame and the upper ends of the front and rear frames. A bumper includes a front-rear frame portion extending forward from the front frame, and an inclined frame portion arranged between an intermediate portion of the front frame and an end portion of the front-rear frame portion. The bumper includes a sub-bumper, the sub-bumper including a front sub-frame extending upward from a front end of the bumper, and a front-rear sub-frame connected between an end portion of the front sub-frame and an intermediate portion of the front frame above the upper frame.

7 Claims, 8 Drawing Sheets

(51) Int. Cl.
*B60R 19/02* (2006.01)
*B62D 23/00* (2006.01)
*B62D 21/11* (2006.01)
*B62D 21/05* (2006.01)

(56) References Cited

U.S. PATENT DOCUMENTS

| | | | | |
|---|---|---|---|---|
| 4,950,026 | A * | 8/1990 | Emmons | B62D 21/06 |
| | | | | 296/203.01 |
| 9,365,241 | B1 | 6/2016 | Taracko et al. | |
| 2006/0186699 | A1* | 8/2006 | Davis | B62D 23/005 |
| | | | | 296/187.01 |
| 2014/0035259 | A1* | 2/2014 | Koren | B60G 3/20 |
| | | | | 280/638 |
| 2015/0375803 | A1* | 12/2015 | Raska | B60N 2/012 |
| | | | | 280/639 |
| 2018/0072348 | A1* | 3/2018 | Hisada | B62D 23/005 |

* cited by examiner

VEHICLE FRAME STRUCTURE

INCORPORATION BY REFERENCE

The present application claims priority under 35 U.S.C. § 119 to Japanese Patent Application No. 2018-185985 filed on Sep. 28, 2018. The content of the application is incorporated herein by reference in its entirety.

TECHNICAL FIELD

The present invention relates to a vehicle frame structure.

BACKGROUND ART

Conventionally, it is known that a bumper is provided on a front portion frame assembly that has a scaffold shape supporting vehicle front wheels (see, for example, Patent Document 1). In Patent Document 1, the front portion frame assembly has, at an upper portion and a lower portion thereof, fastening portions orientated in a front-rear direction and fastened with a main frame assembly. When front collision occurs, the bumper is deformed and the fastening portions extending forward and rearward are deformed, so that impact energy of the collision may be absorbed.

PRIOR ART DOCUMENT

Patent Document

[Patent Document 1]
U.S. Pat. No. 9,365,241

SUMMARY OF THE INVENTION

Problem to be Solved by the Invention

However, although the scaffold portion configuring the front portion frame assembly is configured to maintain its shape, it is desired to be able to absorb larger impact energy.

The present invention has been made in view of the above-described circumstances, and an object of the present invention is to provide a vehicle frame structure capable of absorbing larger impact energy.

Means for Solving the Problem

In a vehicle frame structure provided in a vehicle which includes a front portion frame assembly (21) for supporting left and right front wheels (12) and a bumper (80) attached to the front portion frame assembly (21), the front portion frame assembly (21) includes a lower frame (63) for supporting a lower arm (64) and an upper frame (67) for supporting an upper arm (68), front and rear end portions of the lower frame (63) and the upper frame (67) are connected vertically by a front frame (65) and a rear frame (66), respectively, and upper ends of the front frame (65) and the rear frame (66) are connected to each other above the upper frame (67). The front portion frame assembly (21) is connected to a main frame assembly (22) via the lower frame (63) and the upper ends of the front frame (65) and the rear frame (66). The bumper (80) includes a front-rear frame portion (81) extending forward from the front frame (65), and an inclined frame portion (82) arranged between an intermediate portion (65A1) of the front frame (65) and an end portion of the front-rear frame portion (81). The bumper (80) includes a sub-bumper (85), the sub-bumper (85) having a front sub-frame (83) extending upward from a front end of the bumper (80) and a front-rear sub-frame (84) connected between an end portion of the front sub-frame (83) and an intermediate portion of the front frame (65) above the upper frame (67).

In the above configuration, the front-rear frame portion (81) may extend forward from a connecting portion between the upper frame (67) and the front frame (65).

Further, in the above configuration, the inclined frame portion (82) may be connected to the front frame (65) at a position between the lower frame (63) and the upper frame (67).

Further, in the above configuration, the vehicle frame structure may include an upper support frame portion (71) extending rearward from a connecting portion (66C) between the front frame (65) and the rear frame (66), the lower frame (63) may include a lower support frame portion (90) extending rearward beyond the rear frame (66), and the lower support frame portion (90) may be larger in diameter than the upper support frame portion (71).

Further, in the above configuration, a space may be defined between the rear frame (66) and the main frame assembly (22), and a vehicle body operation unit (120, 121) may be disposed in the space.

Further, in the above configuration, cross frames (86, 89) may be provided at a connection position between the front-rear frame portion (81) and the front frame (65) and at a connection position between the front-rear sub-frame (84) and the front frame (65), respectively, and the front-rear frame portion (81) and the front-rear sub-frame (84) may be connected to the front frame (65) via the respective cross frames (86, 89).

Further, in the above configuration, a final case (110) for transmitting power to the wheels (12) may be arranged in a space defined between the front frame (65) and the rear frame (66) and between the upper frame (67) and the lower frame (63).

Effects of the Invention

In a vehicle frame structure provided in a vehicle which includes a front portion frame assembly for supporting left and right front wheels and a bumper attached to the front portion frame assembly, the front portion frame assembly includes a lower frame for supporting a lower arm and an upper frame for supporting an upper arm, front and rear end portions of the lower frame and the upper frame are connected vertically by a front frame and a rear frame, respectively, and upper ends of the front frame and the rear frame are connected to each other above the upper frame. The front portion frame assembly is connected to a main frame assembly via the lower frame and the upper ends of the front frame and the rear frame. The bumper includes a front-rear frame portion extending forward from the front frame, and an inclined frame portion arranged between an intermediate portion of the front frame and an end portion of the front-rear frame portion. The bumper includes a sub-bumper, the sub-bumper having a front sub-frame extending upward from a front end of the bumper and a front-rear sub-frame connected between an end portion of the front sub-frame and an intermediate portion of the front frame above the upper frame. According to this configuration, by connecting the front-rear sub-frame to the intermediate portion of the front frame, when there is an impact applied to the bumper, energy of the impact may be transmitted to the scaffold portion to positively deform the front frame, thereby absorbing the impact energy. By providing an impact applied portion, it is possible to positively deform the scaffold portion.

In the above configuration, the front-rear frame portion may extend forward from a connecting portion between the upper frame and the front frame. According to this configuration, by providing the front-rear frame portion on an extension of the upper frame, the bumper may be provided at a position where high rigidity is expected.

Further, in the above configuration, the inclined frame portion may be connected to the front frame at a position between the lower frame and the upper frame. According to this configuration, since the impact is applied to the front frame between the upper frame and the lower frame, when the impact is applied downward, the impact energy may be absorbed by deforming the front frame between the upper frame and the lower frame.

Further, in the above configuration, the vehicle frame structure may include an upper support frame portion extending rearward from a connecting portion between the front frame and the rear frame, the lower frame may include a lower support frame portion extending rearward beyond the rear frame, and the lower support frame portion may be larger in diameter than the upper support frame portion. According to this configuration, the upper support frame portion may be positively deformed.

Further, in the above configuration, a space may be defined between the rear frame and the main frame assembly, and a vehicle body operation unit may be disposed in the space. According to this configuration, the vehicle body operation unit may be provided at a position where deformation is less likely to occur.

Further, in the above configuration, cross frames may be provided at a connection position between the front-rear frame portion and the front frame and at a connection position between the front-rear sub-frame and the front frame, respectively, and the front-rear frame portion and the front-rear sub-frame may be connected to the front frame via the respective cross frames. According to this configuration, when an impact is applied from the front side, it may be made easier to disperse the impact energy to the left and right and equalize the impact energy transmitted from the cross frames into the left and right front frames.

Further, in the above configuration, a final case for transmitting power to the wheels may be arranged in a space defined between the front frame and the rear frame and between the upper frame and the lower frame. According to this configuration, the impact energy applied to the engine, etc. may be reduced by arranging a power transmission member at a position where high rigidity is expected.

MODE FOR CARRYING OUT THE INVENTION

Figure 1:
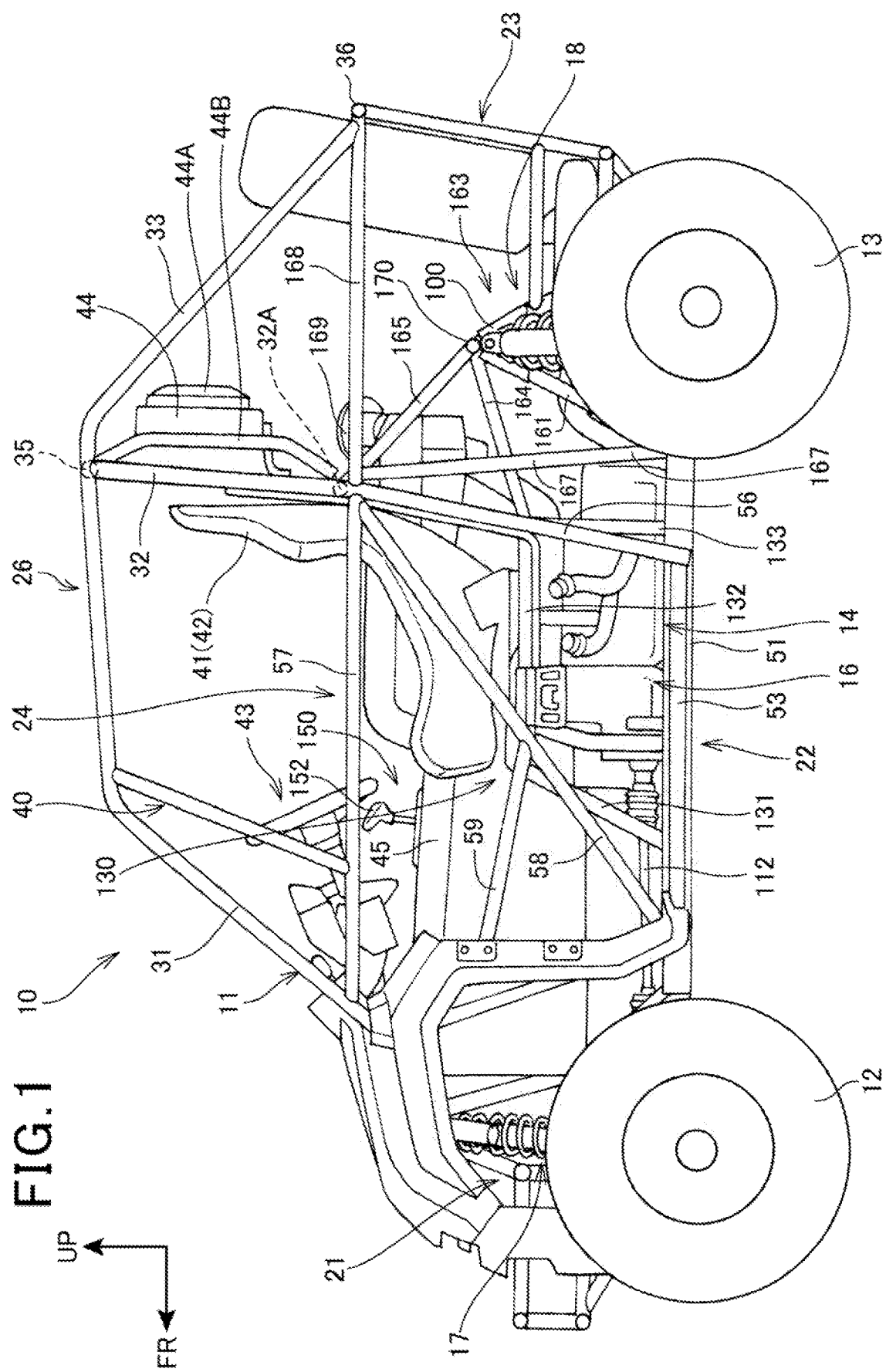
FIG. 1 is a left-side view illustrating an all-terrain vehicle according to an embodiment of the present invention.

Hereinafter, an embodiment of the present invention will be described with reference to the drawings. In the description, the directions such as front and rear, left and right, and up and down are the same as the directions with respect to the vehicle body unless otherwise specified. Further, a symbol FR indicated in the drawings denotes a forward direction with respect to the vehicle body, a symbol UP denotes an upward direction with respect to the vehicle body, and a symbol LH denotes a leftward direction with respect to the vehicle body.

FIG. 1 is a left-side view illustrating an all-terrain vehicle 10 according to the embodiment of the present invention.

The all-terrain vehicle 10 includes a vehicle body frame 11 as a frame structure, a pair of left and right front wheels (vehicle wheels) 12 supported at a front portion of the vehicle body frame 11, and a pair of left and right rear wheels (vehicle wheels) 13 supported at a rear portion of the vehicle body frame 11. The all-terrain vehicle 10 is a multi-utility vehicle (MUV) that travels by supplying driving power to the front wheels 12 and the rear wheels 13 by an engine 14 that is arranged at a lower portion closer to a vehicle body rear side.

Figure 2:
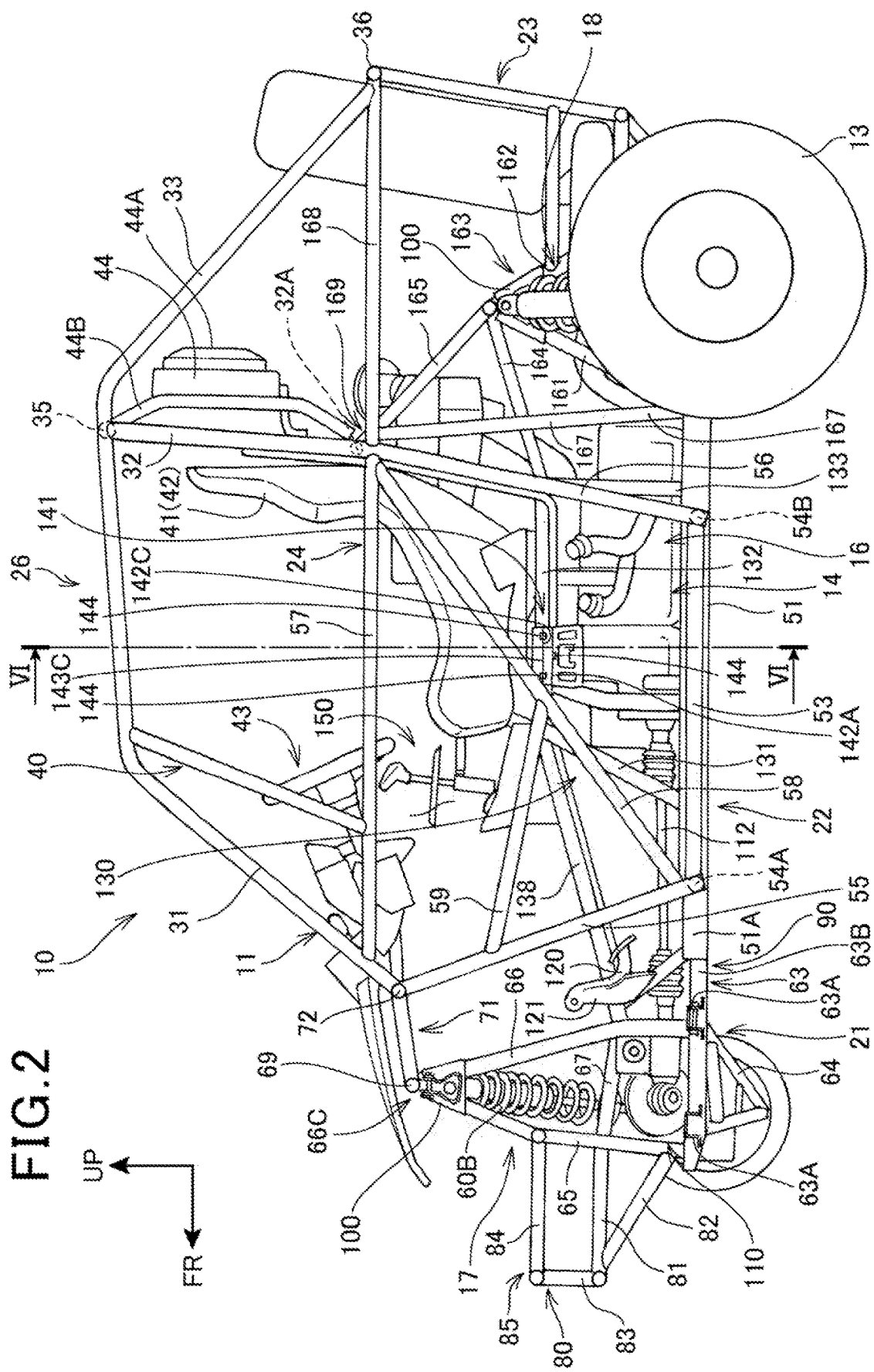
FIG. 2 is a left-side view illustrating a vehicle body frame of the all-terrain vehicle.

FIG. 2 is a left-side view illustrating the vehicle body frame 11 of the all-terrain vehicle 10.

The vehicle body frame 11 includes a front frame assembly 21, a center frame assembly (main frame assembly) 22 connected to a rear portion of the front frame assembly 21, and a rear frame assembly 23 connected to a rear portion of the center frame assembly 22. In addition, the vehicle body frame 11 includes a pair of left and right side frame assemblies 24 attached to side portions of the center frame assembly 22, and an upper frame assembly 26 attached so as to extend upward from the front frame assembly 21, the side frame assemblies 24, and the rear frame assembly 23.

The front frame assembly 21 supports the front wheel 12 via a front suspension 17.

The rear frame assembly 23 supports the rear wheel 13 via a rear suspension 18.

The upper frame assembly 26 includes a pair of left and right front pillars 31 extending obliquely upward to the rear side from rear-upper portions of the front frame assembly 21, a pair of left and right center pillars 32 extending upward from rear portions of the side frame assemblies 24, and a pair of left and right rear pillars 33 extending upward to a front side from rear end portions of the rear frame assembly 23. The left and right front pillars 31, the left and right center pillars 32, and the left and right rear pillars 33 are connected by cross pipes. Among these, lower ends of the center pillars 32 are connected to each other by a cross pipe 32A. Further, upper ends of the center pillars 32 are connected to each other by a cross pipe 35. Rear ends of the rear pillars 33 are connected to each other by a rear cross pipe 36.

A space, which is surrounded by the front frame assembly 21, the center frame assembly 22, the side frame assemblies 24, and the upper frame assembly 26, forms a cabin 40 in which an occupant rides.

In the cabin 40, a left seat 41 and a right seat 42, which are a pair of left and right seats, are arranged on the front side of the center pillars 32 in a vehicle side view. The left seat 41 is a driver's seat, and the right seat 42 is a passenger's seat. The left seat 41 and the right seat 42 are supported on a lower side thereof by a seat frame 130 of the center frame assembly 22. A steering mechanism 43 is arranged in front of the left seat 41.

A radiator 44 is supported on a rear upper side of the seats 41 and 42. The radiator 44 is located between the left seat 41 and the right seat 42. A radiator fan 44A is attached to the radiator 44. The radiator 44 is supported by the cross pipe 35 via a frame 44B.

Figure 3:
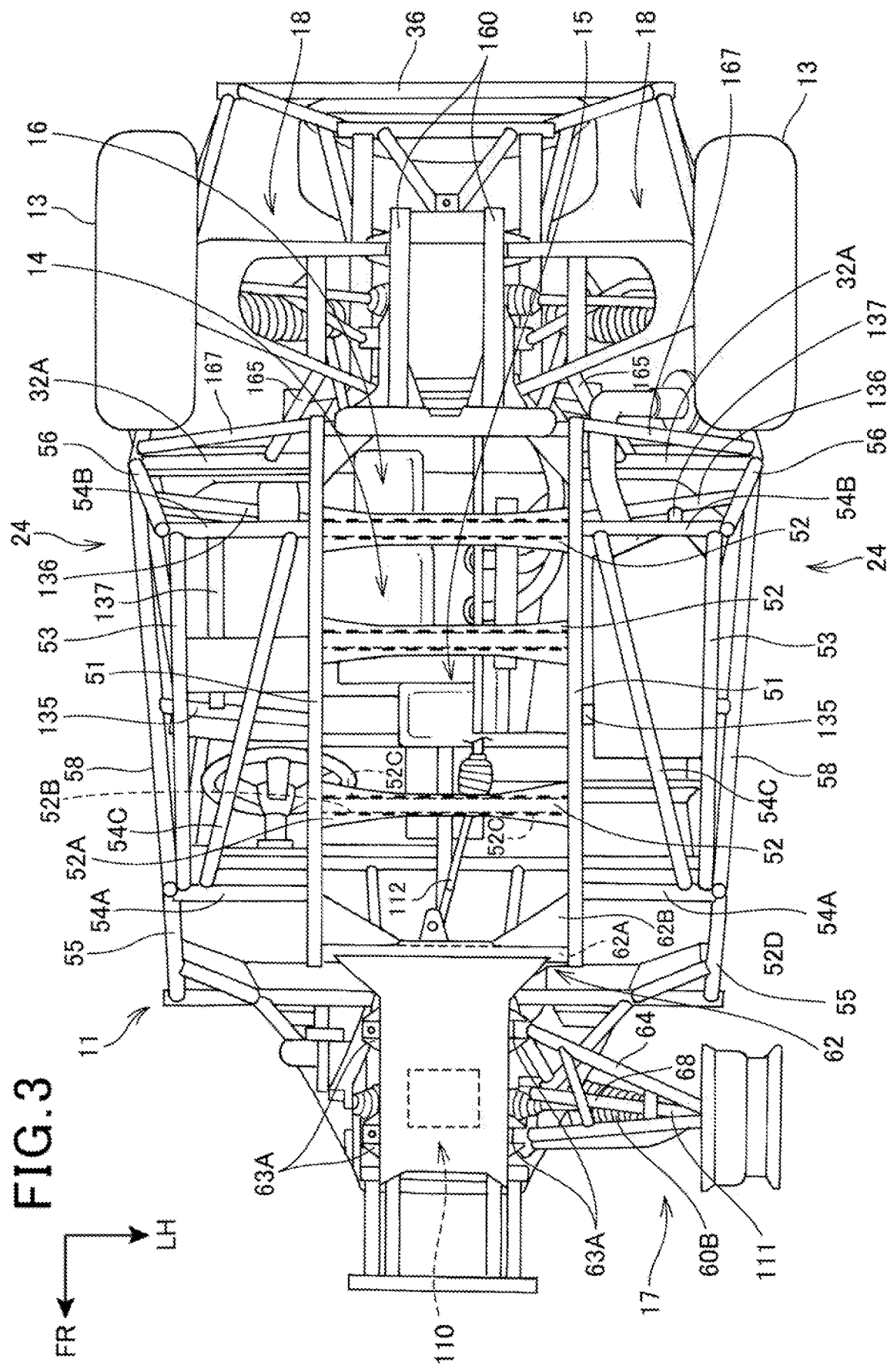
FIG. 3 is a bottom view of the all-terrain vehicle.

FIG. 3 is a bottom view of the all-terrain vehicle 10.

The vehicle body frame 11 has a pair of left and right center-lower frames 51 extending in the front-rear direction. A plurality of cross frames 52 extending in a vehicle width direction are connected to the center-lower frames 51.

The cross frames 52 each include a plate portion 52A having a U-shaped cross section in which a front-rear direction central portion is recessed downward and a cross pipe 52B arranged in the recess of the plate portion 52A. The cross pipe 52B is welded to the recess of the plate portion 52A. The cross pipe 52B is welded along an axial direction, and includes welds 52C welded alternately at the front and rear.

A power unit 16 including the engine 14 and a transmission 15 is supported above the center-lower frames 51.

The pair of left and right side frame assemblies 24 are connected to a vehicle width direction outer sides of the center-lower frames 51. The side frame assembly 24 includes a side lower frame 53 extending in the front-rear direction. Coupling portions 54A and 54B (see FIGS. 2 and 3) extending in the vehicle width direction are connected to front and rear ends of the side lower frame 53, respectively. The coupling portions 54A and 54B are connected to the center-lower frame 51. The front-side coupling portion 54A is connected to a front portion of the center-lower frame 51. The rear-side coupling portion 54B is connected to a rear portion of the center-lower frame 51. A lower inclined frame 54C is connected between a vehicle width direction outer end of the front-side coupling portion 54A and an inner end of the rear-side coupling portion 54B.

As illustrated in FIG. 2, a down frame portion 55 extending downward to the rear side from a lower end of the front pillar 31 is connected to the front-side coupling portion 54A. Further, a rising portion 56 rising upward and extending to the lower end of the center pillar 32 is connected to the rear-side coupling portion 54B.

A side-middle frame 57 extending forward is connected to a connecting portion 169 where the lower end of the center pillar 32 and an upper end of the rising portion 56 are connected to each other.

An inclined frame 58 extending upward to the rear side is connected between a lower end portion of the down frame portion 55 and the connecting portion 169 described above. An inclined frame 59 extending downward to the rear side is connected between an upper portion of the down frame portion 55 and a central portion of the inclined frame 58.

Figure 4:
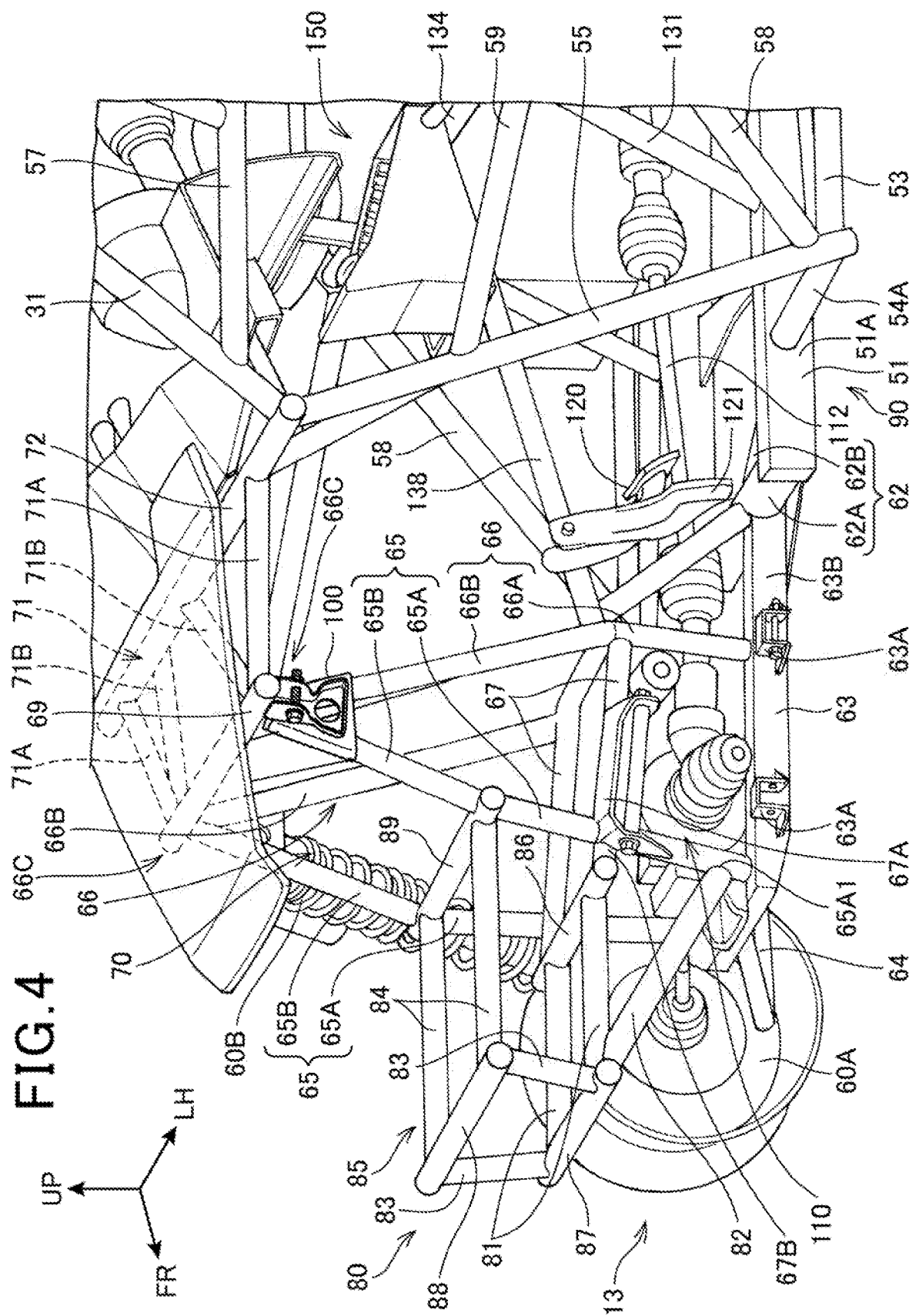
FIG. 4 is a perspective view of a front frame assembly.

FIG. 4 is a perspective view of the front frame assembly 21.

The front frame assembly (front portion frame assembly) 21 is connected to front portions of the center-lower frames 51. The front frame assembly 21 has a front-lower cross frame 62. The front-lower cross frame 62 is connected between front ends of the left and right center-lower frames 51. The front-lower cross frame 62 includes a pipe-shaped inner frame 62A and gusset portions 62B covering the inner frame 62A.

A pair of left and right front-lower frames (lower frames) 63 extending forward are connected to the front-lower cross frame 62. Each of the front-lower frames 63 is provided with a pair of front and rear brackets 63A. Front-lower arms (lower arms) 64 are swingably supported by the brackets 63A. The front-lower arms 64 rotatably support the front wheel 12 via a knuckle 60A.

A front frame 65 extending upward is connected to a front end portion of the front-lower frame 63. The front frame 65 includes a lower portion 65A extending upward in a slightly inclined manner to the vehicle width direction outer side, and an upper portion 65B extending obliquely upward to the rear side from an upper end of the lower portion 65A.

A rear frame 66 is connected to an upper end of the front frame 65. The rear frame 66 includes an upper portion 66B inclined downward to the rear side, and a lower portion 66A extending downward from a lower end of the upper portion 66B and connected to a front-rear direction central portion of the front-lower frame 63. The lower portion 66A of the rear frame 66 is shorter than the lower portion 65A of the front frame 65.

A front-upper frame (upper frame) 67 extending in the front-rear direction is supported between a vertical direction central portion of the lower portion 65A of the front frame 65 and an upper end of the lower portion 66A of the rear frame 66. The front-upper frame 67 is provided with a bracket 67A. A front-upper arm (upper arm) 68 (see FIG. 3) is swingably supported by the bracket 67A. The front-upper arm 68, together with the front-lower arms 64, rotatably supports the front wheel 12 via the knuckle 60A.

A connecting portion 66C, at which the upper end of the front frame 65 and an upper end of the rear frame 66 are connected to each other, is located above the front-upper frame 67 in a vehicle side view. A cushion support portion 100 is supported by the connecting portion 66C. A front cushion unit 60B is supported by the cushion support portion 100. The knuckle 60A is connected to a lower end of the front cushion unit 60B.

The front suspension 17 includes the front-lower arms 64, the front-upper arm 68, the front cushion unit 60B, the knuckle 60A, etc.

In FIG. 4, a front-top cross pipe 69 extending in the vehicle width direction is connected to the left and right connecting portions 66C of the front frames 65 and the rear frames 66.

The front-lower frames 63, the front frames 65, the rear frames 66, the front-upper frames 67, and the front-top cross pipe 69 constitute a scaffold portion 70. That is, the front suspension 17 is supported by the scaffold portion 70.

Figure 5:
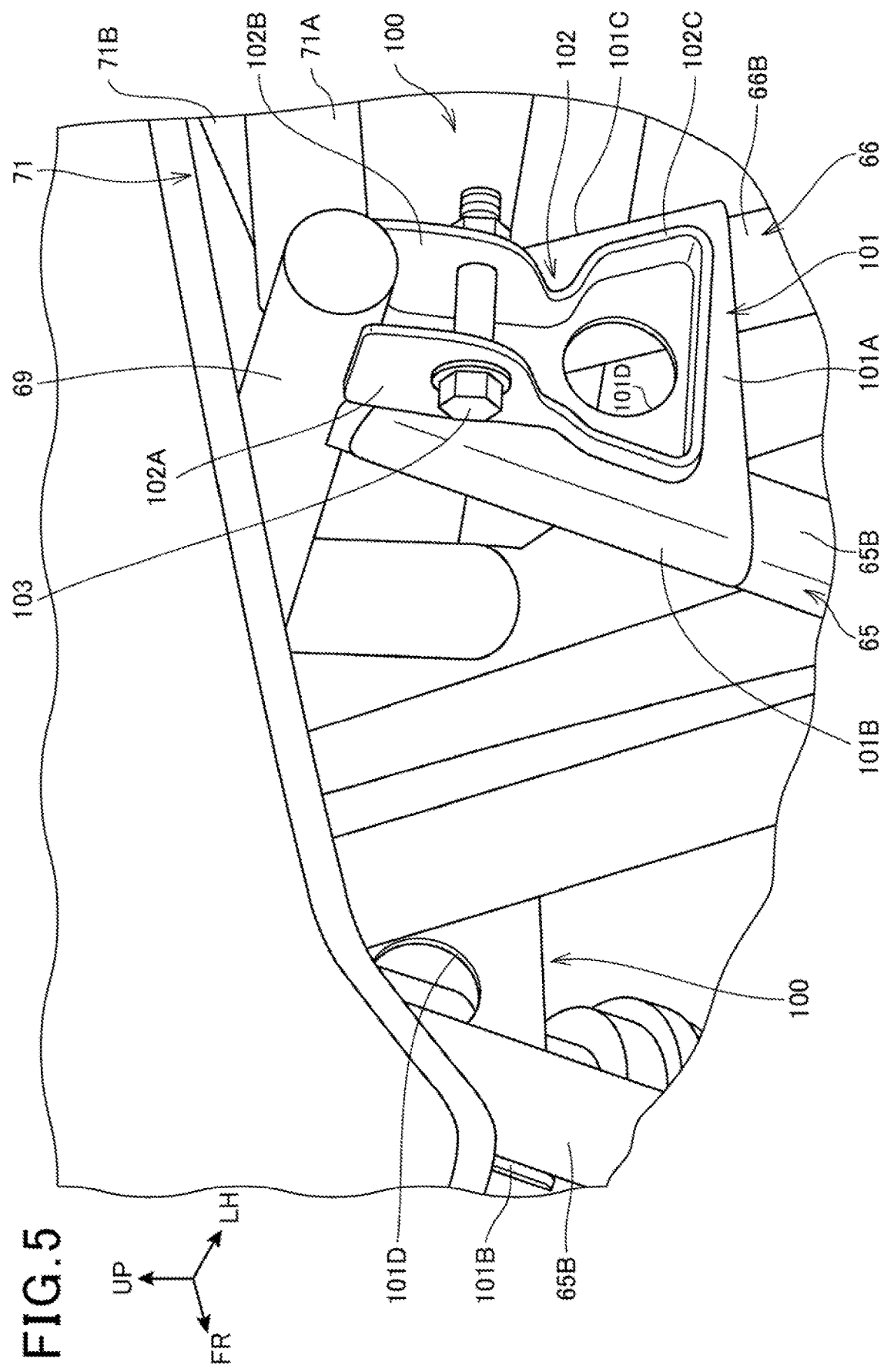
FIG. 5 is an enlarged perspective view of a cushion support portion and its periphery of the front frame assembly.

FIG. 5 is an enlarged perspective view of the cushion support portion 100 and its periphery of the front frame assembly 21.

The cushion support portion 100 is welded to the connecting portion 66C that is a top portion of the scaffold portion 70. The cushion support portion 100 includes a triangular gusset plate portion 101 and a bracket portion 102 fixed to the gusset plate portion 101.

The gusset plate portion 101 includes a triangular plate-shaped main body portion 101A, and engaging portions 101B and 101C formed on opposite front and rear ends of the main body portion 101A. The engaging portions 101B and 101C are curved to a vehicle width direction inner side as they advance to front-rear direction outer sides. The front-side engaging portion 101B is arranged along the upper portion 65B of the front frame 65, and the rear-side engaging portion 101C is arranged along the upper portion 66B of the rear frame 66. The main body portion 101A has a through hole 101D passing therethrough in the vehicle width direction.

The bracket portion 102 standing on a surface of the gusset plate portion 101 is provided so as to surround the through hole 101D. The bracket portion 102 includes a pair of front and rear fixing portions 102A and 102B and a linking portion 102C that connects the fixing portions 102A and 102B. The linking portion 102C is bent along an outer edge shape on a lower side of the gusset plate portion 101.

A pivot shaft 103 extending in the front-rear direction is supported by the fixing portions 102A and 102B. A lower portion of the front-top cross pipe 69 arranged above enters a space between the fixing portions 102A and 102B. The front cushion unit 60B is supported by the pivot shaft 103.

An upper support frame portion 71 extends rearward from the connecting portions 66C. The upper support frame portion 71 includes a pair of left and right outer pipes 71A inclined to the vehicle width direction outer side and a pair of left and right inner pipes 71B inclined to the vehicle width direction inner side. The outer pipes 71A and the inner pipes 71B are connected to a cross frame 72 extending in the vehicle width direction. The cross frame 72 connects the left and right connecting portions between the front pillars 31 and the down frame portions 55 to each other in the vehicle width direction. Therefore, the scaffold portion 70 is connected to the main frame assembly 22 side at the upper support frame 71 via the connecting portions 66C. Further, the scaffold portion 70 is connected to the main frame assembly 22 side via the front-lower frames 63.

A bumper 80 is connected to the scaffold portion 70. The bumper 80 includes front-rear frame portions 81 extending forward from the respective front frames 65. At a front end portion of each of the front-rear frame portions 81, an inclined frame portion 82 that is inclined downward to the rear side is connected. A lower end of the inclined frame portion 82 is connected to an intermediate portion 65A1, in the vertical direction, of the lower portion 65A of the front frame 65.

A front sub-frame 83 extending upward and slightly inclined to the vehicle width direction outer side is connected to a front end of the front-rear frame portion 81. An upper end of the front sub-frame 83 is connected to a front-rear sub-frame 84 extending rearward. The front-rear sub-frame 84 is connected to a lower end of the upper portion 65B of the front frame 65. The front-rear sub-frame 84 is located above the front-upper frame 67 in the vertical direction. A sub bumper 85 includes the left and right front sub-frames 83 and the left and right front-rear sub-frames 84.

In the present embodiment, by connecting the front-rear sub-frames 84 to the intermediate portions of the front frames 65, when there is an impact applied to the bumper 80 from a vehicle body outside, energy of the impact is transmitted to the scaffold portion 70 and the front frames 65 may be positively deformed, thereby absorbing the impact energy. That is, it is possible to provide an impact applied portion, and to positively deform the scaffold portion 70.

A cross frame 86 extending in the vehicle width direction is connected to rear ends of the front-rear frame portions 81 of the bumper 80. Front end portions 67B of the front-upper frames 67 are connected to opposite ends of the cross frame 86. These front end portions 67B extend forward with respect to the front frames 65 and are connected to the cross frame 86 on the vehicle width direction outer sides with respect to the front-rear frame portions 81. By providing the front-rear frame portion 81 on an extension of the front-upper frame 67 in the vehicle side view illustrated in FIG. 2, the bumper 80 can be provided at such a position that high rigidity is expected. Therefore, when an impact is applied to the bumper 80 from the front side, the impact energy is likely to act in the upward direction without causing deformation to the just rearward.

In addition, the inclined frame portions 82 of the bumper 80 are connected to the intermediate portions 65A1, of the front frames 65, located between the front-lower frames 63 and the front-upper frames 67. Therefore, since an impact is applied to the front frames 65 between the front-upper frames 67 and the front-lower frames 63, when an impact is applied downward, the impact energy may be absorbed by deforming the lower portions 65A of the front frames 65 between the front-upper frames 67 and the front-lower frames 63.

A cross frame 87 extending in the vehicle width direction is connected between lower ends of the pair of left and right front sub-frames 83 of the sub bumper 85. Also, a cross frame 88 extending in the vehicle width direction is connected between upper ends of the front sub-frames 83.

Further, a cross frame 89 extending in the vehicle width direction is connected to rear ends of the front-rear sub-frames 84. The lower portions 65A and the upper portions 65B of the front frames 65 are connected to vehicle width direction opposite ends of the cross frame 89.

The bumper 80 includes the front-rear frame portions 81, the inclined frame portions 82, the sub bumper 85, and the cross frames 87 and 88.

Here, in the bumper 80, the cross frames 86 and 89 are connected to the rear ends of the front-rear frame portions 81 and the rear ends of the front-rear sub-frames 84, respectively. When an impact is applied to the bumper 80 from the front side, the cross frames 86 and 89 can disperse the impact energy to the left and right, and it can be made easier to equalize the impact energy transmitted from the cross frames 86 and 89 into the pair of left and right front frames 65.

The upper support frame portion 71 on the upper side of the scaffold portion 70 has the pipes in a cylindrical shape. The front-lower frames 63 below the scaffold portion 70 are each in a square tube shape. Here, the front-lower frames 63 extend rearward with respect to the rear frames 66, and the front-lower cross frame 62 and the center-lower frames 51 connected to the front-lower cross frame 62 are connected to the rear side of the front-lower frames 63. A lower support frame portion 90 includes extending portions 63B of the front-lower frames 63 behind the rear frames 66, the front-lower cross frame 62, and front end portions 51A of the center-lower frames 51. A diameter of the inner frame 62A of the front-lower cross frame 62 is larger than diameters of the outer pipes 71A and the inner pipes 71B. Accordingly, cross-sectional shapes of the front-lower frames 63 and the center-lower frames 51 in a square tube shape are also larger than cross-sectional shapes of the outer pipes 71A and the inner pipes 71B of the upper support frame portion 71. Therefore, the lower support frame portion 90 includes the pipes having larger cross-sectional shapes than the pipes of the upper support frame portion 71, and when an impact is applied to the bumper 80, the upper support frame portion 71 can be positively deformed.

A front wheel final case 110 with a differential gear and a speed reduction mechanism is arranged between the left and right front-lower frames 63. The front wheel final case 110 is arranged between the front frames 65 and the rear frames 66, and also arranged between the front-lower frames 63 and the front-upper frames 67 in the vehicle side view. The front wheel final case 110 is arranged in a space inside the scaffold portion 70. Therefore, a power transmission member such as the front wheel final case 110 can be arranged at a position where high rigidity is expected, and the impact energy applied to the engine 14, etc. can be reduced. A front-side propeller shaft 112 extending from the power unit 16 is connected to a rear portion of the front wheel final case 110. A pair of left and right front wheel drive shafts 111 are connected to the front wheel final case 110. The front wheel drive shafts 111 are connected to the front wheels 12 and transmit power to the front wheels 12.

An accelerator pedal (vehicle body operation unit) 120 and a brake pedal (vehicle body operation unit) 121 are arranged on a left lower side of the scaffold portion 70.

In FIG. 2, the accelerator pedal 120 and the brake pedal 121 are located rearward of the scaffold portion 70 and in front of the down frames 55 at a front end of the center frame assembly 22. Therefore, when an impact is applied to the bumper 80 from the front side, the impact energy is absorbed by the bumper 80, and the frames behind the down frame portions 55 are less likely to be deformed. The accelerator pedal 120 and the brake pedal 121 can be arranged at positions where the frames are less likely to be deformed.

In FIG. 2, the seat frame 130 is connected to the center-lower frames 51. The seat frame 130 includes a rising portion 131 extending upward to the rear side from a front portion of each of the center-lower frames 51. An upper end of the rising portion 131 is connected to an inner seat frame 132 extending rearward. A rear end of the inner seat frame 132 is connected to an upright frame 133 extending downward. A lower end of the upright frame 133 is connected to a rear end of the center-lower frame 51.

A center-upper cross 134 (see FIG. 4) is connected between front ends of the left and right inner seat frames 132.

To front and rear portions of the left and right inner seat frames 132, upper-side cross frames 135 and 136 that are slightly inclined rearward and extend to the vehicle width direction outer sides are connected. The front-side upper-side cross frame 135 is connected to an intermediate portion of the inclined frame 58. The rear-side upper-side cross frame 136 is connected to the rising portion 56.

Outer seat frames 137 extending in the front-rear direction are connected between the front and rear upper-side cross frames 135 and 136.

Figure 6:
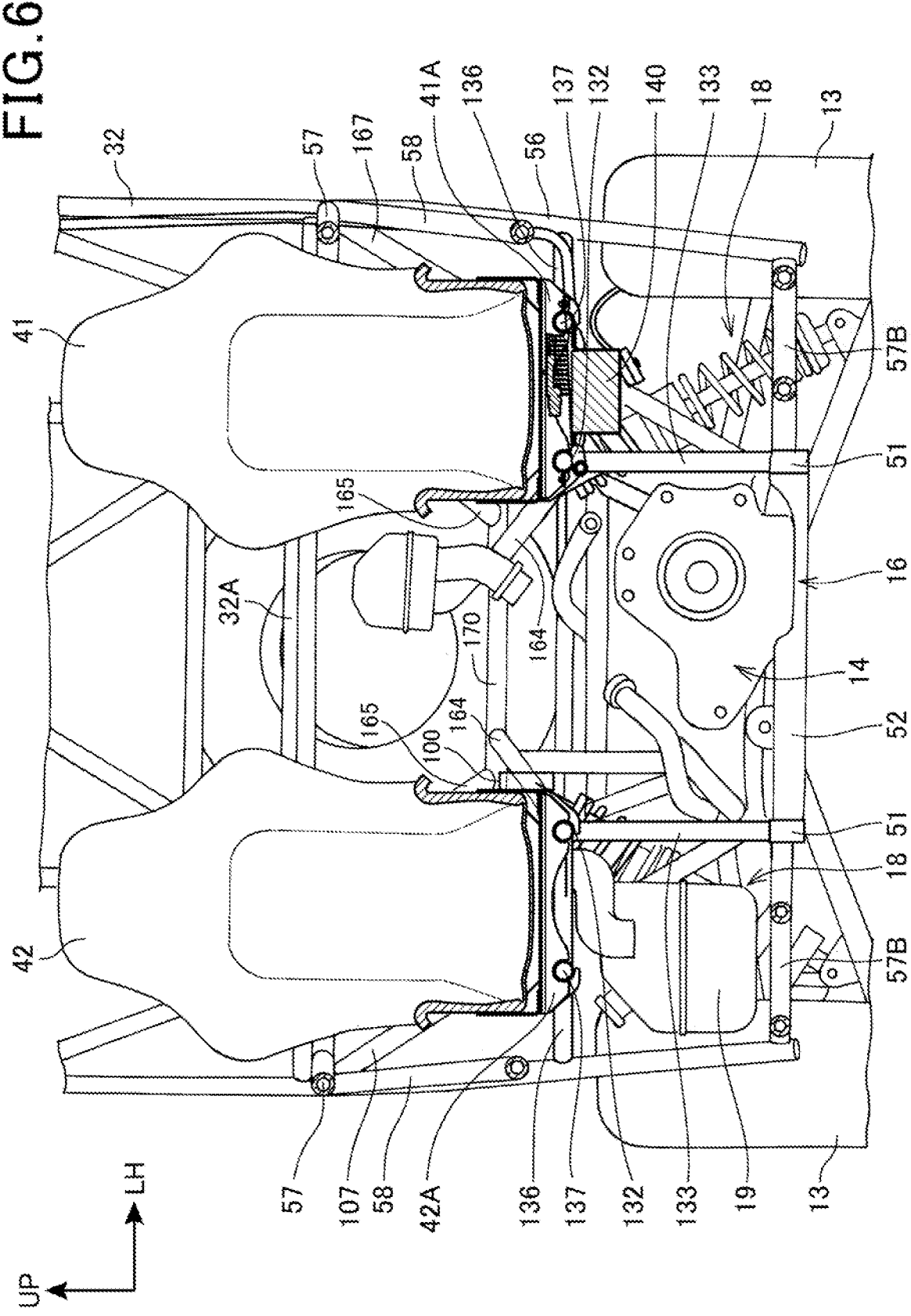
FIG. 6 is a cross-sectional view taken along line VI-VI of FIG. 2

FIG. 6 is a cross-sectional view taken along line VI-VI of FIG. 2.

The inner seat frames 132 and the outer seat frames 137 are each pipe-shaped.

The left seat 41 is attached to the left-side inner seat frame 132 and the left-side outer seat frame 137 via a stay member 41A. The right seat 42 is attached to the right-side inner seat frame 132 and the right-side outer seat frame 137 via a stay member 42A. The power unit 16 with the engine 14 is arranged below and between the left and right seats 41 and 42. A fuel tank 19 is arranged below the right seat 42, and a battery 140 is arranged below the left seat 41.

Figure 7:
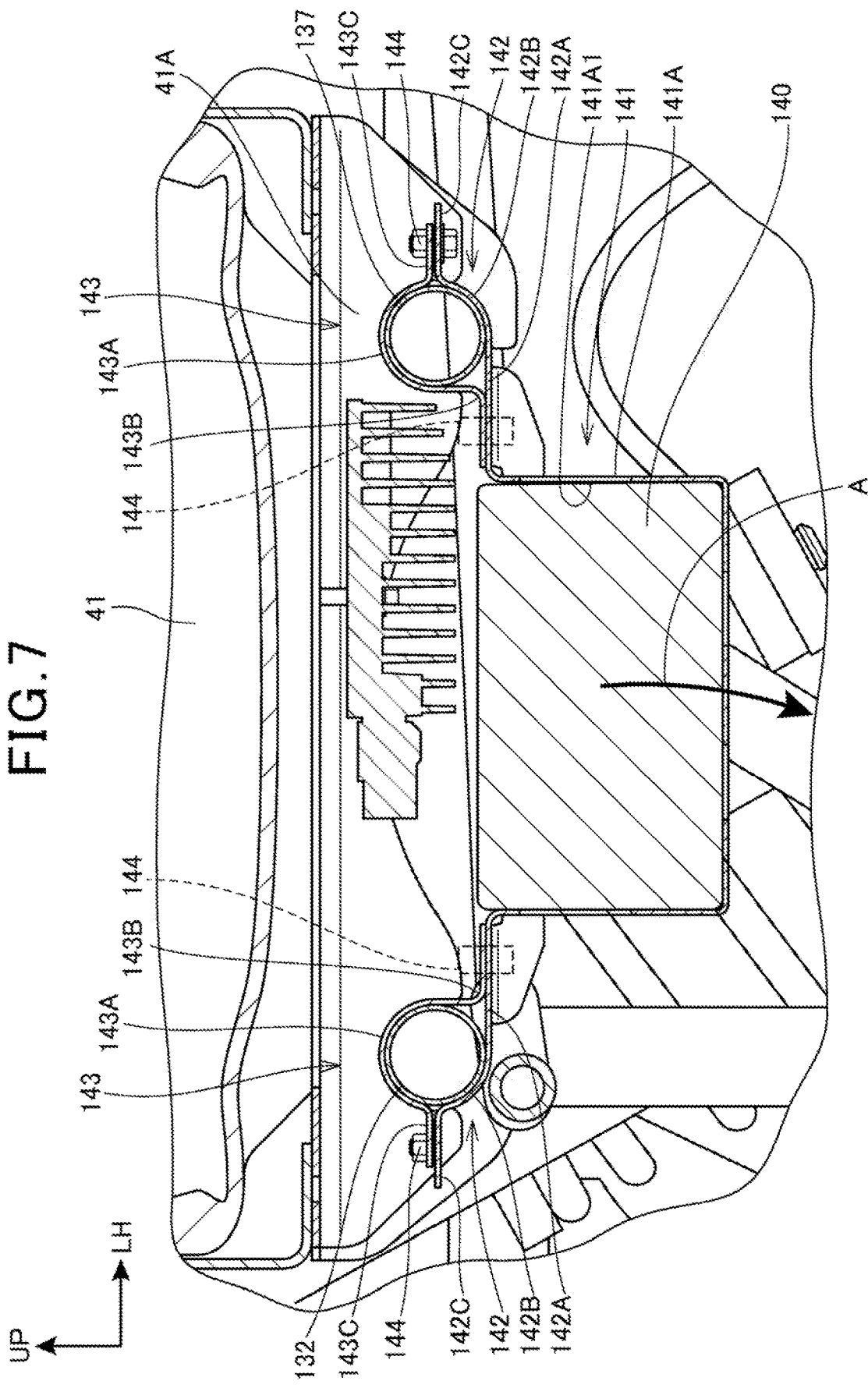
FIG. 7 is an enlarged view of a battery and its periphery of the all-terrain vehicle.

FIG. 7 is an enlarged view of the battery 140 and its periphery illustrated in FIG. 6.

The battery 140 is supported so as to be hung on the left-side inner seat frame 132 and the left-side outer seat frame 137 via a battery stay 141. The battery stay 141 includes a box-shaped housing portion 141A opened on the upper side thereof and housing the battery 140 therein, lower stay portions 142 supported at left and right outer ends of the housing portion 141A, and upper stay portions 143 arranged opposite to the lower stay portions 142. The seat frames 132 and 137 are sandwiched and fixed by the lower stay portions 142 and the upper stay portions 143.

Each of the lower stay portions 142 includes a connecting portion 142A connected to the housing portion 141A, a curved portion 142B extending from the connecting portion 142A and curving upward as separated from the housing portion 141A, and a fixing portion 142C connected to the curved portion 142B and extending in a direction away from the housing portion 141A.

Each of the upper stay portions 143 includes a curved portion 143A forming an integral cylindrical shape together with the curved portion 142B of the lower stay portion 142, and fixing portions 143B and 143C formed on left and right ends of the curved portion 143A.

The seat frames 132 and 137 are disposed between the curved portions 142B of the lower stay portions 142 and the curved portions 143A of the upper stay portions 143, and the connecting portions 142A and the fixing portions 143B are fixed by fixing tools 144, and the fixing portions 142C and the fixing portions 143C are fixed by other fixing tools 144. Thus, the battery 140 is supported by the seat frames 132 and 137 via the battery stay 141.

Here, when replacing the battery 140, etc., an operator removes the outer end fixing tool 144 from the vehicle width direction outer side. At this time, the battery stay 141 rotates in a direction indicated by arrow A around the inner seat frame 132, and the battery 140 in an inner surface 141A1 of the housing portion 141A faces the vehicle width direction outer side. This results in good workability in the case of replacement of the battery 140 or the like. Further, as illustrated in FIG. 7, the fixing portions 142C and the fixing portions 143C are located at higher positions than the connecting portions 142A and the fixing portions 143B, so that the fixing tools 144 can be easily attached to the respective positions.

In FIGS. 2 and 3, a pair of left and right rear-lower frames 160 extending in the front-rear direction are connected to the rearmost one of the cross frames 52 connected to the center-lower frames 51. To front and rear portions of each of the rear-lower frames 160, a rear-front frame 161 extending upward to the rear side and a rear-rear frame 162 extending upward to the front side are connected. The rear-front frame 161 and the rear-rear frame 162 are connected to each other at upper ends thereof to form a scaffold shape. A cushion support portion 100 is welded to be fixed to the upper end portions of the rear-front frame 161 and the rear-rear frame 162.

The rear wheel 13 is supported via the rear-lower frame 160, a rear-upper frame (not illustrated), and the rear suspension 18 connected to the cushion support portion 100.

A cross frame 170 is connected between the left and right upper end portions of the rear-front frames 161 and the rear-rear frames 162. As illustrated in FIG. 6, inclined frames 164, which are inclined to the vehicle width direction inner side and extending upward to the rear side from the rear ends of the inner seat frames 132, are connected to the cross frame 170. Inclined frames 165 are connected to the cross frame 170 on the vehicle width direction outer sides with respect to the inclined frames 164 and extend upward to the front side. The inclined frames 165 extend to the vehicle width direction outer sides while being inclined, and are connected to the cross pipe 32A.

As illustrated in FIG. 2, a rear-middle frame 168, which is connected to the rear cross pipe 36, is connected to a rear end of the side-middle frame 57. A rear rising portion 167 extending to the vehicle width direction outer side and slightly inclined upward to the front side is connected to the rear end of the center-lower frame 51. The rear rising portion 167 is connected to the side-middle frame 57 in the vicinity of the cross pipe 32A (see FIG. 3). As described above, the connecting portions (concentration points) 169, at which frame connection points are concentrated, are provided on the rear side of the seats 41 and 42 in the vehicle side view. In the present embodiment, the cross pipe 32A is connected between the left and right connecting portions 169, so that the strength may be easily improved.

Figure 8:
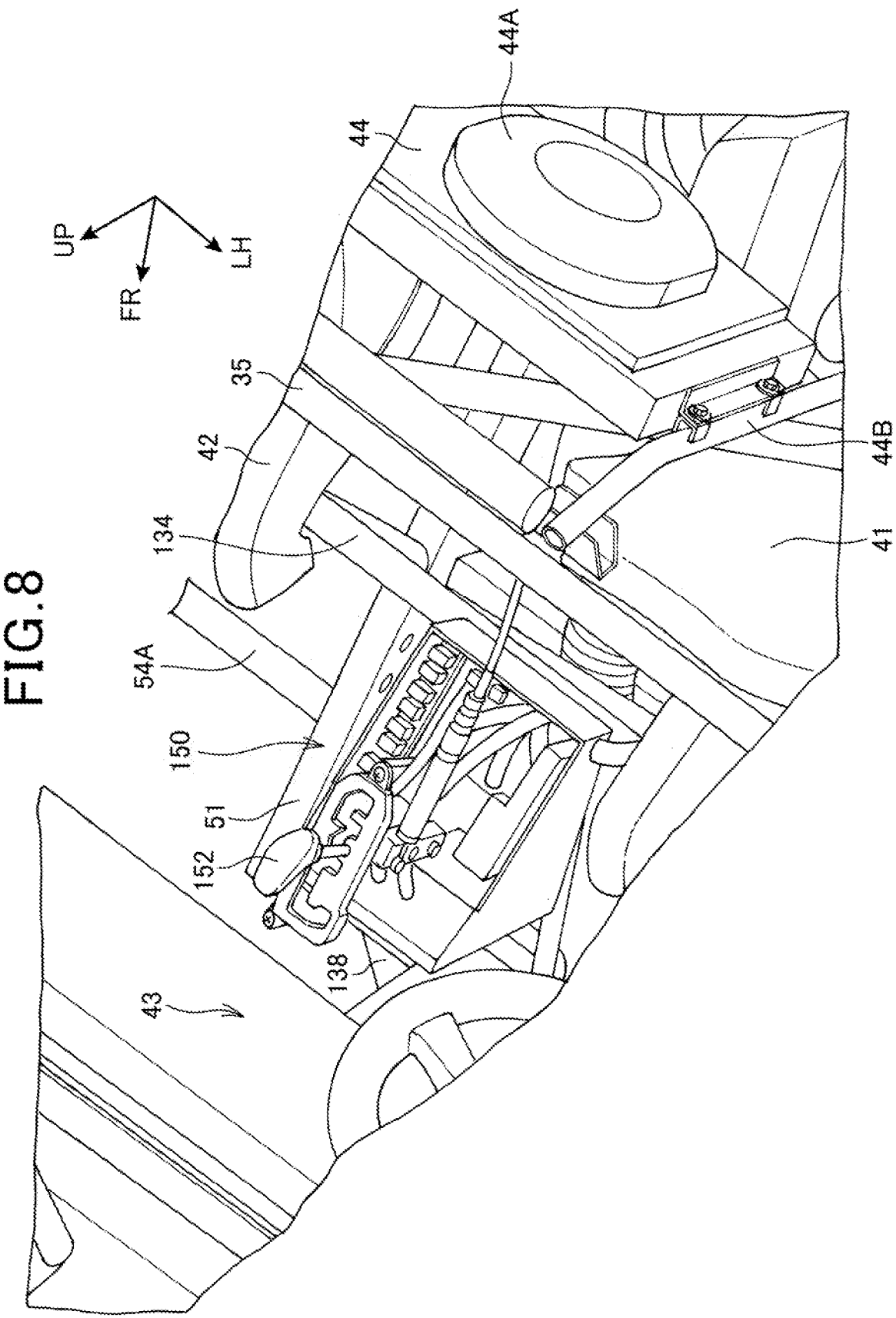
FIG. 8 is a rear perspective view of an electrical component box and its periphery of the all-terrain vehicle.

FIG. 8 is a rear perspective view of an electrical component box 150 and its periphery of the all-terrain vehicle 10.

Between the left seat 41 and the right seat 42, a center inclined frame 138 extending downward to the front side is connected to a vehicle width direction central portion of the center-upper cross 134 (see FIG. 4). The electrical component box 150 is supported by the center inclined frame 138. The electrical component box 150 houses therein various electrical components such as an electronic control unit (ECU), a fuse, a relay, and a regulator. An operation lever 152 is arranged above the electrical component box 150. Lower parts of the electrical component box 150 and the operation lever 152 are protected by a box cover 45 (see FIG. 1). Since the electrical component box 150 is arranged between the left seat 41 and the right seat 42, the electrical component box 150 may be easily attached and detached.

As described above, according to the present embodiment to which the present invention is applied, in a vehicle frame structure provided in a vehicle which includes a front frame assembly 21 for supporting left and right front wheels 12 and a bumper 80 attached to the front frame assembly 21, the front frame assembly 21 includes a front-lower frame 63 for supporting a front-lower arm 64 and a front-upper frame 67 for supporting a front-upper arm 68, front and rear end portions of the front-lower frame 63 and the front-upper frame 67 are connected vertically by a front frame 65 and a rear frame 66, respectively, and upper ends of the front frame 65 and the rear frame 66 are connected to each other above the front-upper frame 67. The front frame assembly 21 is connected to a center frame assembly 22 via the front-lower frame 63 and the upper ends of the front frame 65 and the rear frame 66. The bumper 80 includes a front-rear frame portion 81 extending forward from the front frame 65, and an inclined frame portion 82 arranged between an intermediate portion 65A1 of the front frame 65 and an end portion of the front-rear frame portion 81. The bumper 80 includes a sub-bumper 85, the sub-bumper 85 having a front sub-frame 83 extending upward from a front end of the bumper 80 and a front-rear sub-frame 84 connected between an end portion of the front sub-frame 83 and an intermediate portion of the front frame 65 above the front-upper frame 67.

Therefore, by connecting the front-rear sub-frame 84 to the intermediate portion of the front frame 65, when there is an impact applied to the bumper 80, energy of the impact may be transmitted to the scaffold portion 70 to positively deform the front frame 65, thereby absorbing the impact energy. By providing an impact applied portion, it is possible to positively deform the scaffold portion 70.

In the present embodiment, the front-rear frame portion 81 extends forward from a connecting portion between the front-upper frame 67 and the front frame 65. Therefore, by providing the front-rear frame portion 81 on an extension of the front-upper frame 67, the bumper 80 may be provided at a position where high rigidity is expected.

Further, in the present embodiment, the inclined frame portion 82 is connected to the front frame 65 at a position between the front-lower frame 63 and the front-upper frame 67. Therefore, since the impact is applied to the front frame 65 at the position between the front-upper frame 67 and the front-lower frame 63, when the impact is applied downward, the impact energy may be absorbed by deforming the front frame 65 at the position between the front-upper frame 67 and the front-lower frame 63.

Further, in the present embodiment, the vehicle frame structure includes an upper support frame portion 71 extending rearward from a connecting portion 66C between the front frame 65 and the rear frame 66, the front-lower frame 63 includes a lower support frame portion 90 extending rearward beyond the rear frame 66, and the lower support frame portion 90 is larger in diameter than the upper support frame portion 71. Therefore, the upper support frame portion 71 may be positively deformed.

Further, in the present embodiment, a space is defined between the rear frame 66 and the center frame assembly 22, and an accelerator pedal 120 and a brake pedal 121 are disposed in the space. Therefore, the accelerator pedal 120 and the brake pedal 121 may be provided at a position where deformation is less likely to occur.

Further, in the present embodiment, cross frames 86 and 89 are provided at a connection position between the front-rear frame portion 81 and the front frame 65 and at a connection position between the front-rear sub-frame 84 and the front frame 65, respectively, and the front-rear frame portion 81 and the front-rear sub-frame 84 are connected to the front frame 65 via the respective cross frames 86 and 89. Therefore, when an impact is applied from the front side, it may be made easier to disperse the impact energy to the left and right and equalize the impact energy transmitted from the cross frames 86 and 89 into the left and right front frames 65.

Further, in the present embodiment, a front wheel final case 110 for transmitting power to the front wheels 12 is arranged in a space defined between the front frame 65 and the rear frame 66 and between the front-upper frame 67 and the front-lower frame 63. Therefore, the impact energy applied to the engine 14, etc. may be reduced by arranging the front wheel final case 110 and the front-side propeller shaft 112 at a position where high rigidity is expected.

The embodiment described above merely illustrates one aspect of the present invention, and any modification and application may be made without departing from the scope of the present invention.

Although the above embodiment has been described with the all-terrain vehicle 10 as an example, the present invention is not limited to this, and may be applicable to a vehicle provided with the bumper 80.

DESCRIPTION OF REFERENCE SYMBOLS

12 Front wheel (vehicle wheel)
21 Front frame assembly (front portion frame assembly)
22 Center frame assembly (main frame assembly)
63 Front-lower frame (lower frame)
64 Front-lower arm (lower arm)
65 Front frame
65A1 Intermediate portion
66 Rear frame
66C Connecting portion
67 Front-upper frame (upper frame)
68 Front-upper arm (upper arm)
71 Upper support frame portion
80 Bumper
81 Front-rear frame portion
82 Inclined frame portion
83 Front sub-frame
84 Front-rear sub-frame 85 Sub bumper
86, 89 Cross frame
90 Lower support frame portion
110 Front wheel final case (final case)
120 Accelerator pedal (vehicle body operation unit)
121 Brake pedal (vehicle body operation unit)

The invention claimed is:

1. A vehicle frame structure provided in a vehicle which includes a front portion frame assembly for supporting left and right front wheels and a bumper attached to the front portion frame assembly, wherein
the front portion frame assembly includes a lower frame for supporting a lower arm and an upper frame for supporting an upper arm, front and rear end portions of the lower frame and the upper frame are connected vertically by a front frame and a rear frame, respectively, and upper ends of the front frame and the rear frame are connected to each other above the upper frame,
the front portion frame assembly is connected to a main frame assembly via the lower frame and the upper ends of the front frame and the rear frame,
the bumper includes a front-rear frame portion extending forward from the front frame, and an inclined frame portion arranged between an intermediate portion of the front frame and an end portion of the front-rear frame portion,
the bumper includes a sub-bumper, the sub-bumper having a front sub-frame extending upward from a front end of the bumper and a front-rear sub-frame connected between an end portion of the front sub-frame and an intermediate portion of the front frame above the upper frame, and
a first cross frame is provided at a connection position between the front-rear sub-frame portion and the front frame, and the front-rear sub-frame is connected to the front frame via the first cross frame.

2. The vehicle frame structure according to claim 1, wherein
the front-rear frame portion extends forward from a connecting portion between the upper frame and the front frame.

3. The vehicle frame structure according to claim 1, wherein
the inclined frame portion is connected to the front frame at a position between the lower frame and the upper frame.

4. The vehicle frame structure according to claim 1, wherein
the vehicle frame structure includes an upper support frame portion extending rearward from a connecting portion between the front frame and the rear frame, the lower frame includes a lower support frame portion extending rearward beyond the rear frame, and the lower support frame portion is larger in diameter than the upper support frame portion.

5. The vehicle frame structure according to claim 1, wherein
a space is defined between the rear frame and the main frame assembly, and a vehicle body operation unit is disposed in the space.

6. The vehicle frame structure according to claim 1, wherein
a second cross frame is provided at a connection position between the front-rear frame portion and the front frame, and the front-rear frame portion is connected to the front frame via the second cross frame.

7. The vehicle frame structure according to claim 1, wherein
a final case for transmitting power to the wheels is arranged in a space defined between the front frame and the rear frame and between the upper frame and the lower frame.

* * * * *